United States Patent [19]
Takagi

[11] Patent Number: 5,855,928
[45] Date of Patent: Jan. 5, 1999

[54] INJECTION MOLD FOR OPTICAL DISCS

[75] Inventor: Toshiyuki Takagi, Shizuoka, Japan

[73] Assignee: Toshiba Machine Co., Ltd., Tokyo, Japan

[21] Appl. No.: 885,836

[22] Filed: Jun. 30, 1997

[30] Foreign Application Priority Data

Jun. 28, 1996 [JP] Japan .................................. 8-169885

[51] Int. Cl.$^6$ ............................ B29C 33/30; B29C 45/26
[52] U.S. Cl. ................... 425/190; 425/192 R; 425/437; 425/810
[58] Field of Search ............................. 425/190, 192 R, 425/195, 437, 810

[56] References Cited

U.S. PATENT DOCUMENTS

| | | | |
|---|---|---|---|
| 4,737,096 | 4/1988 | Poorten .................................. | 425/810 |
| 4,917,833 | 4/1990 | Cools ..................................... | 425/810 |
| 5,316,466 | 5/1994 | Tanaka et al. ......................... | 425/810 |
| 5,466,145 | 11/1995 | Takahashi ............................. | 425/810 |
| 5,516,276 | 5/1996 | Takayama et al. .................... | 425/810 |
| 5,648,106 | 7/1997 | Miyairi et al. ......................... | 425/810 |

Primary Examiner—James P. Mackey
Attorney, Agent, or Firm—Whitham, Curtis & Whitham

[57] ABSTRACT

An injection mold for optical discs has a stamper mounted on any one of mold surfaces defining a mold cavity, a cylindrically shaped center pressing member being inserted into and engaged with a center portion of the stamper, and a cylinder piston being placed at a center portion of the mold and movable in forward and backward directions by a fluid pressure in relation to the center pressing member so as to make the center pressing member in contact with the top of the cylinder piston whereby the stamper is detachably mounted on the mold by the center pressing member. The injection mold for optical discs is characterized in that a plurality of crews are provided on the center pressing member at its contact portion to the cylinder piston at circumferentially constant pitch and projections to be engaged with the crews are provided on the top of the cylinder piston, wherein the crews of the center pressing member, the projections and grooves of the cylinder piston, a receiving surface of the mold for positioning the insertion position of the center pressing member with reference to the mold are placed in concentric circle.

15 Claims, 6 Drawing Sheets

INJECTION MOLD FOR OPTICAL DISCS

BACKGROUND OF THE INVENTION

The present invention relates to an injection mold for discs such as optical discs, and more particularly to an injection mold for optical discs which has a structure suitable for fixing and exchanging a stamper being mounted on a mold surface of either a movable mold and a stationary mold.

Various structures of a mounting member for mounting the stamper on the mold surface of the mold have been proposed. In general, the stamper is detachably mounted at its peripheral portion and center portion by mounting members.

In the Japanese laid-open utility model publication No. 58-159619, it is disclosed that the stamper is fixed at its peripheral portion by engaging a fixing ring and at its center portion by a stamper fixing pin penetrating the center portion of the stamper, wherein one end of the stamper fixing pin is inserted into a center hole of the mold whilst an opposite end of the stamper fixing pin is provided with a tapered groove so that a wedge-shaped member slidably provided on the mold is engaged with the tapered groove to fix the stamper on the mold.

In the Japanese patent publication No. 62-45809, it is disclosed that the stamper is fixed at its peripheral portion by use of a ring member with screws and at its center portion by a pin-shaped stamper pressing member penetrating the center portion of the stamper, wherein one end of the pin-shaped stamper pressing member is inserted into the mold whilst an opposite end of the pin-shaped stamper pressing member is provided with screws engaged with a gear mechanism externally adjustable to fix and detach the stamper.

The above first conventional structure, where the engagement pin for fixing the center of the stamper provides an advantage of in easy operation but has disadvantages in that the center portion of the stamper is added with offset load whereby the stamper is mounted with a displacement to the mold surface of the mold. This may cause defective mold articles.

The above second conventional structure, where the opposite sides of the engagement pin are fixed with the screws, has disadvantages in complicated operations for detaching the stamper. If, in order to facilitate the external operations, the structure is modified, the modified structure may be complicated resulting in increase in manufacturing cost of the mold.

Figure 1:
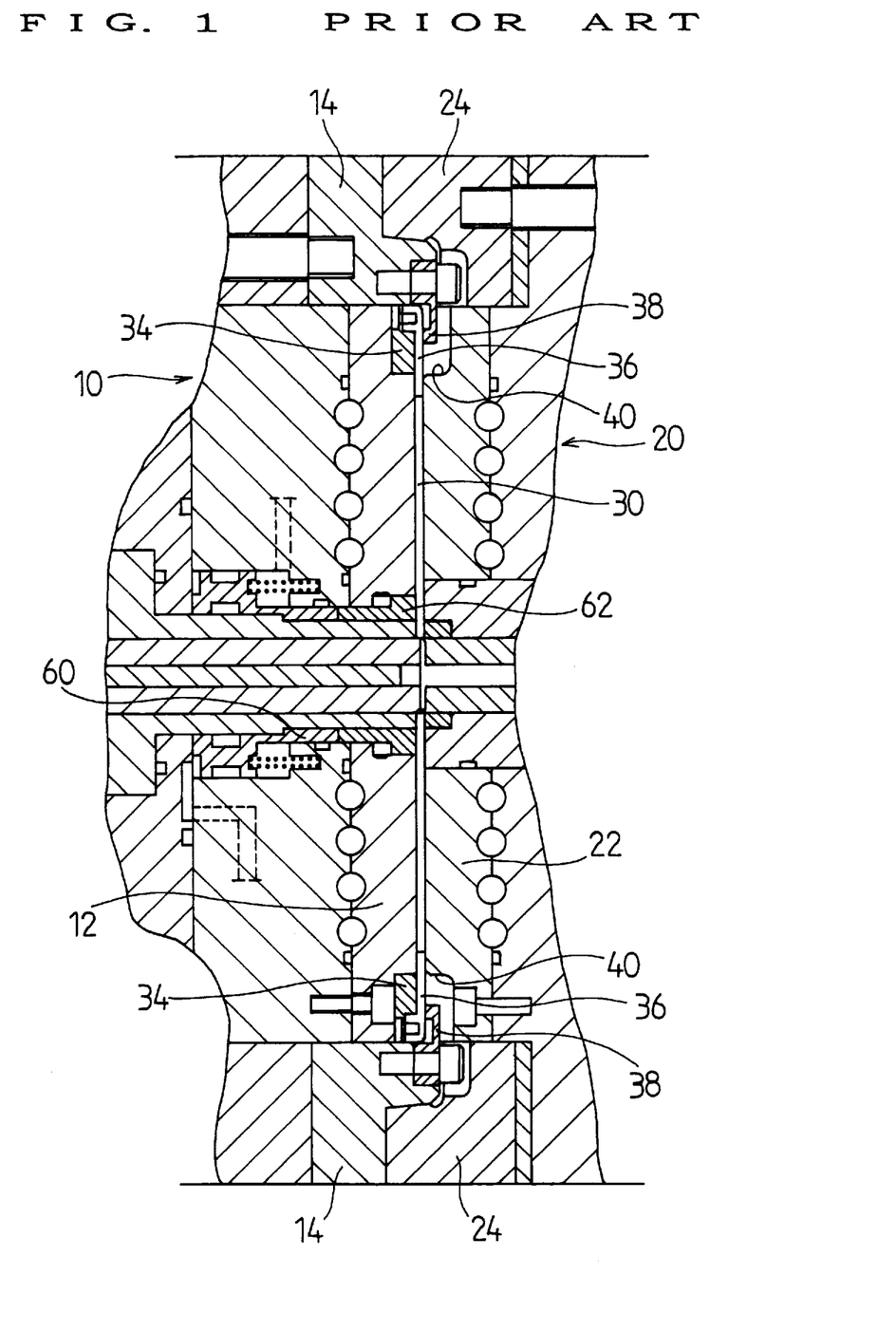
FIG. 1 is a fragmentary cross sectional elevation view illustrative of the conventional injection mold for optical discs.
Figure 2:
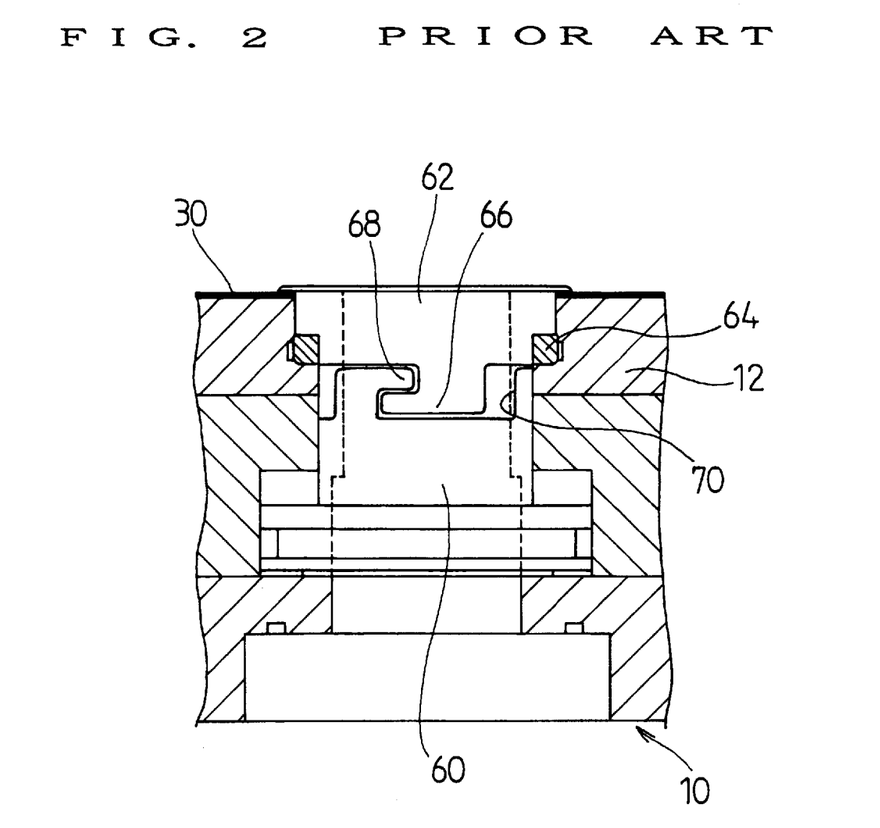
FIG. 2 is a fragmentary enlarged cross sectional elevation view illustrative of the conventional mounting mechanism at a center of a stamper on the conventional injection mold for optical discs.

In order to solve the above problems, the stamper mounting mechanism for mounting the stamper on the mold surface of the mold had been improved for facilitating the fixing and exchanging operations of the stamper and for allowing the quick and sure operations for fixing and exchanging the stamper. The modified stamper mounting mechanism is illustrated in FIGS. 1 and 2. Each of a movable mold 10 and a stationary mold 20 is provided with insert members 12 and 22 in the form of a mold cavity and rings 14 and 24 for positioning the mold cavity. A stamper 30 is provided on the mold surface of the movable mold. Ring members 34 and 36 are mounted in a peripheral portion of the stamper 30. A plurality of claw members 38 are circumferentially and provided at almost constant angle on insides of the ring 14 provided on the movable mold on which the stamper 30 is also mounted. Clearance grooves 40 are provided inside the ring 24 and outside the insert 22 in correspondence to the above claw members 38 so as to allow the claw members 38 to be engaged within the clearance grooves 40 whereby the stamper is detachably mounted at its peripheral portion on the mold surface of the mold.

In the above injection mold, a cyrindrically shaped center pressing member 62 is inserted into and engaged with the center portion of the stamper 30. A plurality of crews 66 are provided on an opposite side of the center pressing member 62 to the side which presses the stamper 30 at circumferentially constant pitch. A cylinder piston 60 forwardly and backwardly operable is placed at the center portion of the movable mold with the mold surface on which the stamper 30 is mounted. An engaging portion is provided at the top of the cylinder piston 60. The engaging portion is made into contact with and engaged with the crews 66 by rotation of the center pressing member. The stamper 30 is detachably mounted on the mold surface of the movable mold by forward and backward movements of the cylinder piston 60.

The cylindrically shaped center pressing member 62 is inserted into and engaged within the center portion of the stamper 30 so as to face to the cylinder piston 60 provided at the center of the movable mold 10. Further, the positioning of the insertion position of the center pressing member 62 to the mold is made by the ring 64 placed at a part of the insert member 12.

In order to fix the center pressing member 62, the crews 66 are provided at circumferentially constant pitch on opposite stamper side (contact portion to the cylinder piston 60 of the center pressing member 62) whilst projections 68 on the top of the cylinder piston 60, which faces to the crews 66, are provided so that the projections 68 are engaged with the crews 66 whereby the center pressing member 62 and the cylinder piston 60 are detachably fixed to each other.

The above third conventional structure has the disadvantages as described below. The ring 64 receives a resin pressure against the center pressing member 62. Since clamp areas formed by the crews 66, the projections 68, and the grooves 70 are positioned inside the ring 64, an inner diameter of the stamper 30 is larger than the diameter of the ring 64. This means it is difficult to reduce the inner diameter of the stamper 30.

SUMMARY OF THE INVENTION

Accordingly, it is an object of the present invention to provide a novel injection mold for optical discs, which is free from the disadvantages as described above.

It is a further object of the present invention to provide a novel injection mold for optical discs, which is provided with an improved mounting structure for mounting a stamper on a mold surface of a mold.

It is a furthermore object of the present invention to provide a novel injection mold for optical discs, which is provided with an improved mounting structure for mounting a stamper on a mold surface of a mold, wherein the mounting structure allows easy, quick and sure operations of fixing and exchanging the stamper.

It is a still further object of the present invention to provide a novel injection mold for optical discs, which is provided with an improved mounting structure for mounting a stamper on a mold surface of a mold, wherein a pressing mechanism for pressing a center of the stamper has a small size to reduce an inner diameter of the stamper.

It is a still further object of the present invention to provide a novel injection mold for optical discs, which is improved to prevent generation of any burr in molding a mold article.

The above and other objects, features and advantages of the present invention will be apparent from the following descriptions.

In order to achieve the above objects, an injection mold for optical discs in accordance with the present invention has a stamper mounted on any one of mold surfaces defining a mold cavity, a cylindrically shaped center pressing member being inserted into and engaged with a center portion of the stamper, and a cylinder piston being placed at a center portion of the mold and movable in forward and backward directions by a fluid pressure in relation to the center pressing member so as to make the center pressing member in contact with the top of the cylinder piston whereby the stamper is detachably mounted on the mold by the center pressing member. The injection mold for optical discs is characterized in that a plurality of crews are provided on the center pressing at its contact portion to the cylinder piston at circumferentially constant pitch and projections to be engaged with the crews are provided on the top of the cylinder piston, wherein the crews of the center pressing member, the projections and grooves of the cylinder piston, a receiving surface of the mold for positioning the insertion position of the center pressing member with reference to the mold are placed in concentric circle.

The center pressing member is inserted into and tightly fitted via a sealing member to an inside portion of an inserter of the mold on which the stamper is mounted and an air passage is provided on the inside of the inserter for supplying a releasing air which is introduced through a gap between the center pressing member and the cylinder piston and an inner portion of the center pressing member into a cavity defined between both the molds.

BRIEF DESCRIPTIONS OF THE DRAWINGS

Preferred embodiments according to the present invention will be described in detail with reference to the accompanying drawings.

PREFERRED EMBODIMENT

Figure 3:
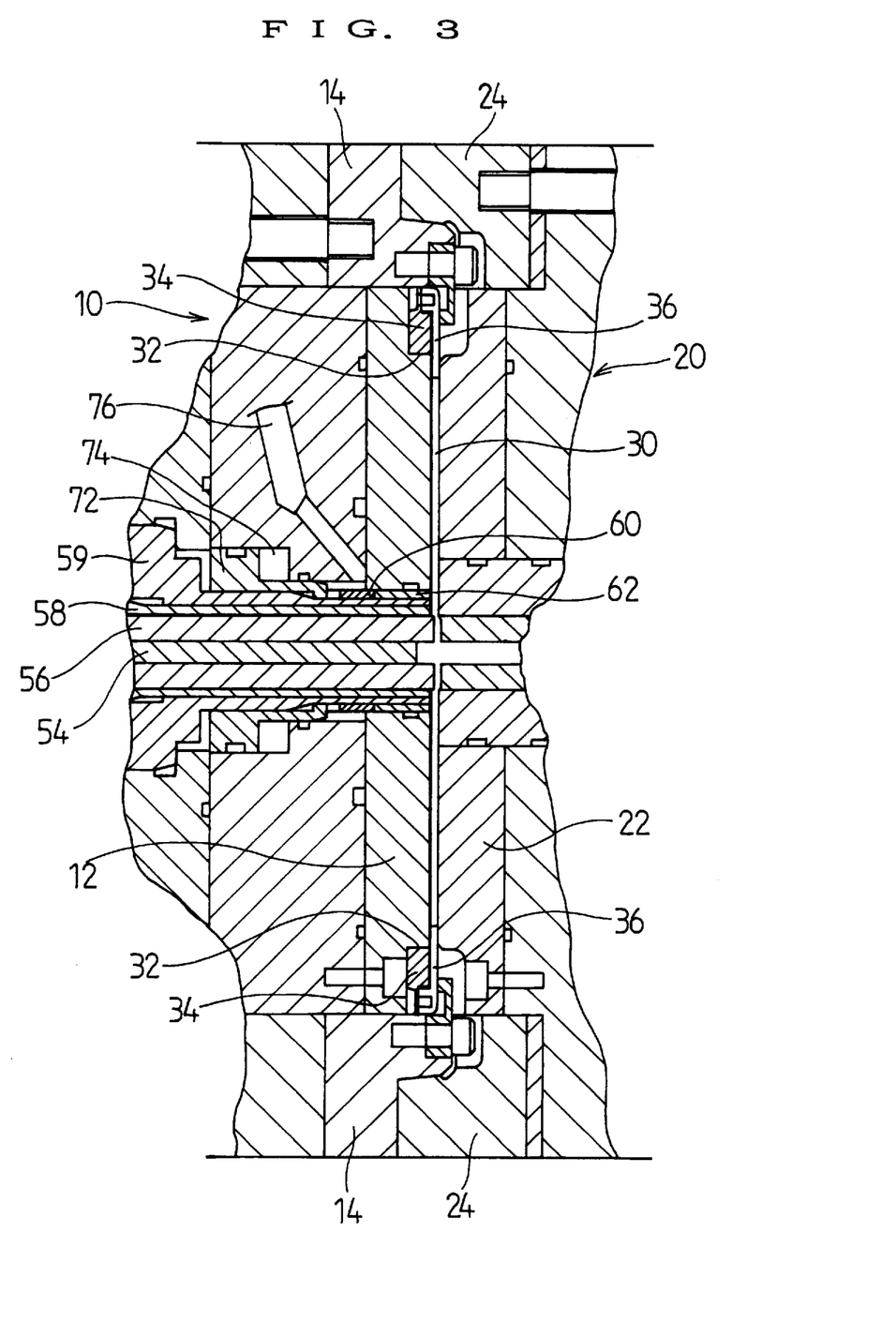
FIG. 3 is a fragmentary cross sectional elevation view illustrative of an improved injection mold for optical discs in a preferred embodiment according to the present invention.

A first embodiment according to the present invention will be described in detail with reference to the accompanying drawings. A movable mold 10 is provided with an insert 12 which forms a circular cavity at a center of the mold and a movable side ring 14 placed on an peripheral region thereof. A stationary mold 20 is also provided with an insert 22 which forms a circular cavity at a center of the mold and a stationary side ring 24 placed on an peripheral region thereof.

A stamper 30 is mounted in a mold surface which is formed on an outer surface of the insert 12 of the movable mold 10.

A fixing ring member 34 is provided on a peripheral portion of the stamper 30 so that the fixing ring member 34 is engaged with a groove 32 formed on the peripheral region of the insert 12. A supporting ring member 36 is superimposed thereon to hold the peripheral region of the stamper 30. The fixing ring member 34 and the supporting ring member 36 are fixed by screws.

The center of the movable mold 10 is provided with a center pin 56 which guides a projecting pin and an extrusion sleeve 58 surrounding and holding the center pin 56. A cylinder piston 60 is provided on the peripheral portion of the center sleeve 59 for fixing a center pressing member 62 mounted on at a center of the stamper 30 so that the cylinder piston 60 is movable in forward and backward directions.

Figure 4:
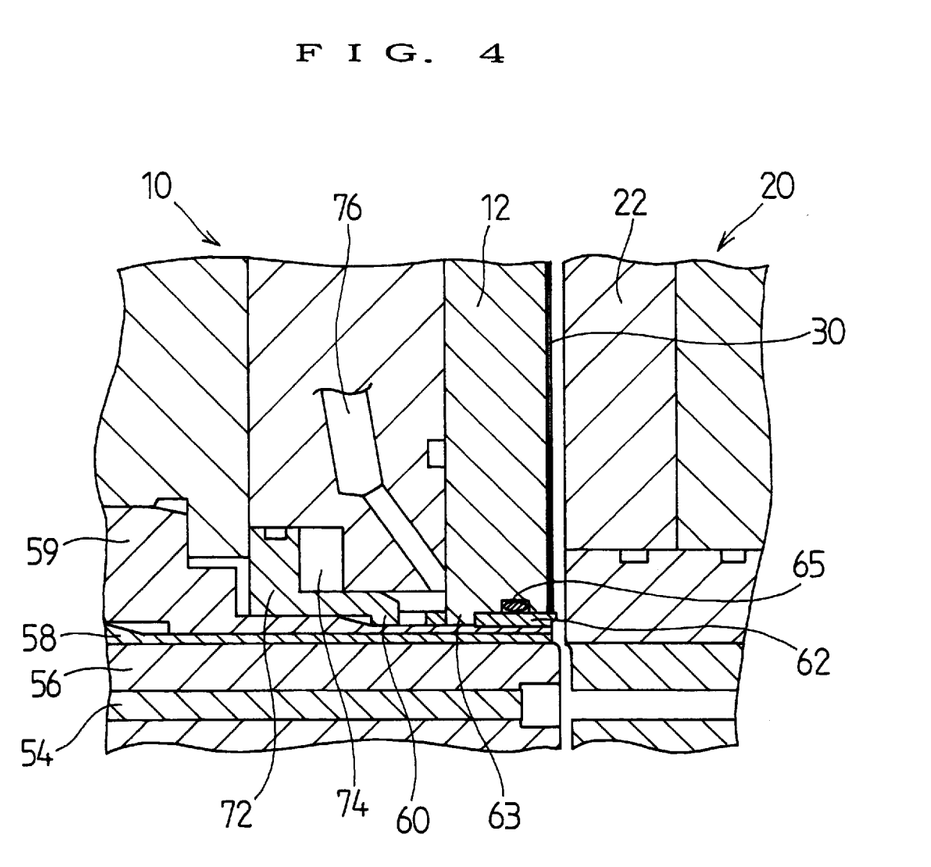
FIG. 4 is a fragmentary enlarged cross sectional elevation view illustrative of an improved injection mold of FIG. 3.

At the center of the stamper 30, a cylindrically shaped center pressing member 62 is inserted into and engaged with the center of the stamper 30 so that the cylindrically shaped center pressing member 62 faces to the cylinder piston 60 provided at the center of the movable mold 10. Further, the positioning of the insertion position of the center pressing member 62 to the mold is made by a receiving surface 63 formed at a part of the insert 12. The resin pressure in the mold is transmitted through the center pressing member 62 to the pressure receiving face 63.

Figure 5:
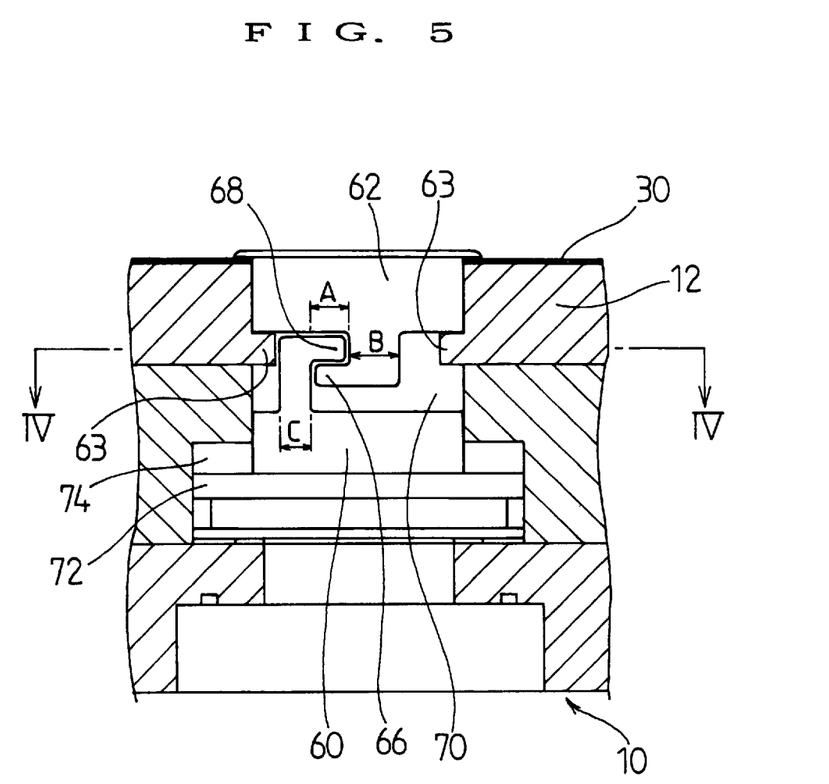
FIG. 5 is a fragmentary enlarged cross sectional elevation view illustrative of a novel mounting mechanism at a center of a stamper on an improved injection mold for optical discs.
Figure 6:
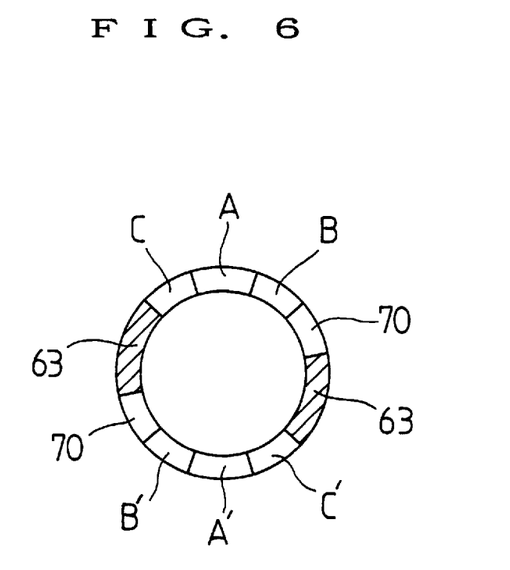
FIG. 6 is a cross sectional elevation view taken along IV—IV line illustrative of the stamper.

In order to fix the center pressing member 62, the crews 66 are provided at circumferentially constant pitch on opposite stamper side contact portion to the cylinder piston 60 of the center pressing member 62 whilst projections 68 on the top of the cylinder piston 60, which faces to the crews 66, are provided so that the projections 68 are engaged with the crews 66 whereby the center pressing member 62 and the cylinder piston 60 are detachably fixed to each other. The crews of the center pressing member, the projections and grooves of the cylinder piston, a receiving surface of the mold for positioning the insertion position of the center pressing member with reference to the mold are placed in concentric circle.

The center pressing member is inserted into and tightly fitted via a sealing member to an inside portion of an inserter of the mold on which the stamper is mounted and an air passage is provided on the inside of the inserter for supplying a releasing air which is introduced through a gap between the center pressing member and the cylinder piston and an inner portion of the center pressing member into a cavity defined between both the molds.

An engagement size in a circumferential direction between the crews 66 provided at the top of the center pressing member 62 and the projections 68 provided at the center of the cylinder piston 60 is defined as "A". A size of the crew 66 in the circumferential direction is defined as "B". A size of the projection 68 in the circumferential direction is defined as "C". The sizes "A", "B", and "C" are defined among the pressure receiving surface 63 and the groove 70 as illustrated in FIG. 5. The cylinder piston 60 is movable in forward and backward directions by inflow of oil hydraulics or pressure air into a fluid chamber 74 or by discharge of oil hydraulics or pressure air from the fluid chamber 74 under operations of the switching valve, wherein the fluid chamber 74 is provided to surround the piston 72.

When the cylinder piston 60 moves in the forward direction, the center pressing member 62 projects from the mold surface of the mold. Therefore, if the center pressing member 62 rotates in a predetermined direction and pulls, the center pressing member 62 is easily released. In order to attach the center pressing member 62, after the cylinder piston 60 has been advanced, the crews 66 of the center pressing member 62 are engaged with the projections 68 of the cylinder piston 60. Thereafter, the cylinder piston 60 moves in the backward direction to fix the center pressing member 62.

An O-ring 65 is provided as a sealing member on the insert 12 of the movable mold 10 to surround the peripheral portion of the center pressing member 62. An air passage 76 is provided in the movable mold 10. Air is blown through the air passage 76, the gasp of the groove 70 of the cylinder piston 60 of the movable mold 10 and the gap between the center pressing member 62 and the center sleeve 59 to the cavity defined between the movable mold 10 and the stationary mold 20 to promote the release of the mold article from the mold.

In accordance with the present invention, the stamper 30 is easily fixed onto and detached for exchange from the mold surface of the mold by detaching the attachment to the center of the stamper 30. A pressing member is detached and fixed to the center of the stamper 30 for easy attachment and exchange operations of the stamper.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims any modifications of the present invention which fill within the spirit and scope of the present invention.

What is claimed is:

1. An injection mold for optical discs comprising:
   a movable mold having a molding surface and a receiving surface;
   a stamper being mounted on the movable mold molding surface, and having a center portion and further defining a mold cavity;
   a cylindrically shaped center pressing member having an upper portion and a lower portion, the upper portion engaging the center portion of the stamper and the lower portion contacting at least a portion of the receiving surface of the movable mold; and
   a cylinder piston being placed at a center portion of the movable mold and movable in a forward direction and a backward direction by a fluid pressure in relation to the center pressing member, the cylinder piston having a top portion being in close proximity with the center pressing member;
   a plurality of crews extending downward from the lower portion of the center pressing member and being at a circumferentially constant pitch;
   projections extending from the top portion of the cylinder piston and engaging the plurality of crews;
   grooves being formed substantially by a bottom surface of the center pressing member and a top surface of the cylinder piston,
   the crews, the projections, the grooves and the receiving surface being placed in a concentric circle, and
   the stamper being detachably mounted on the mold by the center pressing member when the cylinder piston moves in the forward direction.

2. The injection mold as claimed in claim 1, further comprising:
   a stationary mold opposing the movable mold;
   an inserter being inserted into at least one of the movable mold and the stationary mold, the stamper being mounted on the inserter;
   a sealing member being provided proximate to the center pressing member, the center pressing member being inserted into and tightly fitted via the sealing member to an inside portion of the inserter; and
   an air passage being provided on the inside of the inserter and supplying a releasing air introduced through a gap between the center pressing member and the cylinder piston and a cavity defined between the movable mold and the stationary mold wherein
   the center pressing member has substantially constant cross sectional area between the upper portion and the lower portion.

3. The injection mold as claimed in claim 2, wherein the sealing member is an O-ring.

4. The injection mold as claimed in claim 2, wherein the sealing member surrounds a peripheral portion of the center pressing member.

5. The injection mold as claimed in claim 1, further comprising an air passage within the movable mold.

6. The injection mold as claimed in claim 1, further comprising a fixing ring member being provided on a peripheral portion of the stamper.

7. The injection mold as claimed in claim 6, further comprising a superimposing ring member being superimposed on the fixing ring member.

8. The injection mold as claimed in claim 1, wherein a resin pressure in the injection mold is transmitted through the center pressing member to the receiving surface of the movable mold.

9. The injection mold as claimed in claim 1, wherein the center pressing member projects from the molding surface when the cylinder piston moves in the forward direction.

10. The injection mold as claimed in claim 1, further comprising:
    a center pin engaging a center portion of the injection mold;
    an extrusion sleeve holding the center pin; and
    a center sleeve substantially surrounding the extrusion sleeve, the center pressing member being fixed to the center sleeve.

11. The injection mold as claimed in claim 1, wherein an inner diameter of the stamper is substantially the same diameter as an outer diameter of the center pressing member.

12. An injection mold comprising:
    a movable mold having a stamping surface and a receiving surface positioned substantially parallel to the stamping surface;
    a stamper provided on the stamping surface of the movable mold;
    a center pressing member having a uniform cross sectional area, a lip and bottom surface, the lip engaging the stamper and the bottom surface contacting at least a portion of the receiving surface of the movable mold;
    at least one hooked shaped crew extending from the bottom surface of the center pressing member; and
    a cylindrical piston being placed at a center portion of the movable mold and movable in a forward direction and a backward direction by a fluid pressure in relation to the center pressing member, the cylindrical piston having a top surface; and
    projections extending from the top surface of the cylindrical piston and engaging the crews, the stamper detaching from the center pressing member when the cylindrical piston moves in the forward direction, and the crews, the projections and the receiving surface being placed in a concentric circle.

13. The injection mold as claimed in claim 12, further comprising:

an inserter being mounted into the movable mold and holding the stamper;

a sealing member being provided proximate to the center pressing member, wherein the center pressing member is inserted into and tightly fitted to an inside portion of the inserter.

14. The injection mold as claimed in claim 13, wherein the sealing member surrounds a peripheral portion of the center pressing member.

15. The injection mold as claimed in claim 12, further comprising an air passage within the movable mold.

* * * * *